(12) United States Patent
Garcia

(10) Patent No.: US 8,176,022 B1
(45) Date of Patent: May 8, 2012

(54) LOCKING PROTOCOL USING DYNAMIC LOCKS AND DYNAMIC SHARED MEMORY

(76) Inventor: Radames Garcia, Union City, NJ (US)

( * ) Notice: Subject to any disclaimer, the term of this patent is extended or adjusted under 35 U.S.C. 154(b) by 509 days.

(21) Appl. No.: 11/510,768

(22) Filed: Aug. 26, 2006

(51) Int. Cl.
*G06F 7/00* (2006.01)
*G06F 12/00* (2006.01)
*G06F 13/372* (2006.01)

(52) U.S. Cl. ......... 707/704; 710/200; 711/150; 711/152
(58) Field of Classification Search .................. 707/704; 710/200; 711/150, 152
See application file for complete search history.

(56) References Cited

U.S. PATENT DOCUMENTS

| | | | |
|---|---|---|---|
| 4,648,036 A | 3/1987 | Gallant | |
| 5,276,835 A | 1/1994 | Mohan et al. | |
| 5,452,450 A | 9/1995 | Delory | |
| 5,469,567 A | 11/1995 | Okada | |
| 5,608,893 A | 3/1997 | Slingwine et al. | |
| 5,737,611 A * | 4/1998 | Vicik | 710/200 |
| 5,796,999 A * | 8/1998 | Azagury et al. | 707/10 |
| 6,101,524 A * | 8/2000 | Choi et al. | 718/102 |
| 6,185,699 B1 * | 2/2001 | Haderle et al. | 714/19 |
| 6,317,869 B1 * | 11/2001 | Adl-Tabatabai et al. | 717/132 |
| 6,363,387 B1 | 3/2002 | Ponnekanti et al. | |
| 6,370,528 B1 | 4/2002 | Landresse | |
| 6,546,443 B1 * | 4/2003 | Kakivaya et al. | 710/200 |
| 6,574,639 B2 * | 6/2003 | Carey et al. | 707/104.1 |
| 6,594,683 B1 * | 7/2003 | Furlani et al. | 718/102 |
| 6,606,626 B1 | 8/2003 | Ponnekanti | |
| 6,631,395 B1 * | 10/2003 | Chessell | 718/101 |
| 6,988,105 B2 | 1/2006 | Houston et al. | |
| 7,188,344 B1 * | 3/2007 | Blue | 718/106 |
| 2002/0138706 A1 * | 9/2002 | Hugly | 711/163 |
| 2003/0140177 A1 * | 7/2003 | Arajs et al. | 709/315 |
| 2004/0002974 A1 * | 1/2004 | Kravitz et al. | 707/8 |
| 2004/0117531 A1 * | 6/2004 | McKenney | 710/200 |
| 2005/0066064 A1 * | 3/2005 | Micheal et al. | 710/1 |
| 2005/0289549 A1 * | 12/2005 | Cierniak et al. | 718/102 |
| 2006/0136392 A1 * | 6/2006 | Zelle | 707/3 |

FOREIGN PATENT DOCUMENTS

| | | |
|---|---|---|
| CA | 2429154 | 5/2002 |
| GB | 2934816 | 5/2004 |
| WO | WO02/099700 | 12/2002 |

OTHER PUBLICATIONS

Goetz, Threading lightly, Parts 1-3, Feb. 1, 2001, IBM.*
Roetter, Writing multithreaded Java applications, Jul. 17, 2001, IBM.*
Arnold et al., The Java Programming Language, Feb. 2000, Addison-Wesley, 2nd Edition.*
Silberschatz et al., Database Systems Concepts, McGraw-Hill, 1997, 3rd Edition Chap. 13, 14.*
X/Open Company Ltd., Distributed Transaction Processing: The XA Specification, Dec. 1991, X/Open Company Ltd.*

* cited by examiner

*Primary Examiner* — Vincent Boccio
*Assistant Examiner* — Huen Wong
(74) *Attorney, Agent, or Firm* — Michael I. Kroll

(57) ABSTRACT

The present invention discloses a Locking Protocol using Dynamic Locks and Dynamic Shared Memory which provides a method whereby a designated critical section monitors object status through employment of counters attached to the object=s definition that will increment and decrement during reading and writing.

14 Claims, 14 Drawing Sheets

26

```
typdef struct 1k_REC {
     int  m_numberObjectAssigned;
     /*how many objects are sharing the lock */ void * m_eventHandle;
     /*event handle used to put to sleep the thread and to wake up the
pthread*/
} typdef 1k_REC * 1k_HAN;

typdef struct ob_REC {
//....OBJECT DEFINITION ....... //
     int     m_readers;   /* how many threads are holding the reader lock in
the object */
     bool    m_writers;   /* 0 or 1 indicates if there are any writer-pthread
updating the object */
     int     m_threadsWaiting;   /* how many threads ( readers and writers )
are waiting to lock this object */
1k_HAN  m_lock;   /* lock used to sync multiple threads */
} typdef ob_REC    * ob_HAN;

Locks - global critical section protects the lock status for all the objects in the
share memory
```

```
readerLock ( ob_HAN  object )
{
   entercriticalsection ( Locks );
   while ( true )
   {
      /* check if there is any writer-thread ready to update this object*/
      if ( !object->m_lock )
      {
        object->m_readers++;
        break;
      }
      /* check if there is any writer-thread updating this object
      if ( !object->m_writers )
      {
        object->m_readers++;
        break;
      } object->m_threadsWaiting++;

leavecriticalsection ( Locks );

/* wait until the writer-thread updates this object */
      waitOnCondition ( object->m_lock->m_eventHandle );

entercriticalsection ( Locks );

object->m_threadsWaiting--;
   }
   leavecriticalsection ( Locks );

```
void ReaderGroupRelease ( ob_HAN object[], int numberOfObjects )
{
  1k_HAN lock;
  EnterCriticalSection( Locks );

//release reader locks for every object in the array
  for ( int i=0; i< numberOfObjects; i++ )
  {
    /*release object reader lock*/
    object[i]->m_readers--;

if ( object[i]->m_lock )
    {
      /* signal if there are writers waiting */
      /* for this object and i'm the last reader of it*/ if ( !object[i]->m_readers && object[i]->m_threadsWaiting )
        wakeupWriterThreads(object[i]->m_lock->m_eventHandle);

/*clean up object[i]->m_lock only if no other threads are waiting for this
  object */ lock = object[i]->m_lock;

if ( !object[i]->m_threadsWaiting )
      {
        object[i]->m_lock->m_numberObjectsAssigned -- ;
        object[i]->m_lock = 0;
      }
      /*if no other threads are using this lock then */
      /* put the lock into reusable lock list*/ if ( !lock->m_ObjectsAssigned )
        addLockHandletoReuseList (lock );
    }
  }

LeaveCriticalSection( Locks );
}
```

```
// this function will lock multiple objects atomically
// 1 - gets or creates a new lock handle
// 2 - release all the reader-lock over every object in the array
// 3 - assigns the new lock to all the objects in the array if they do not have any
assigned yet */
// 4 - look if there is any object in use by other reader-thread or writer-thread
// 5 - if there is at least one object in use then wait until it gets released by the
reader-thread or writer-thread
// 6 - if no objects are in use then acquire writer lock for every object in the
array WriterGroupLock ( ob_HAN object [], int numberOfObjects )
{
   ob_HAN objectToWait;
   1k_HAN lockToshare  = null;
   int  i;

( CONTINUES WITH FIGURE 11B)
```

```
enterCriticalSection ( locks );

//release reader locks for every object in the array
ReaderGroupRelease ( object, numberOfObjects ) ;

while ( true )
{
   //assigns lock to every object
   for ( i=0; i< numberOfObjects; i++ )
   {
      if ( object[i]->m_lock == NULL )
      {
         if ( !lockToshare )
            lockToshare = getnewlock();
         lockToshare->m_numberObjectsAssigned ++;
         object[i]->m_lock = lockToshare;
         break;
      }
   }

//find which object to wait for
   objectToWait  = 0;
   for ( i=0; i< numberOfObjects; i++)
   {
      if ( object[i]->m_readers || object[i]->m_writers )
      {
        objectToWait = object[i];
        break;
      }
   }
```

(CONTINUES WITH FIGURE 11C)

```
       if ( !objectToWait )    /* ready to go */
       {
          for ( i=0; i< numberOfObjects; i++)
              object [i]->m_writers = true;
          break;
       } objectToWait->m_threadsWaiting++;

leaveCriticalSection ( Locks );

// wait for reader-threads or writer-threads to wake me up
       waitOnCondition ( objectToWait->my_lock->m_eventHandle ) ;

enterCriticalSection ( Locks );

objectToWait->m_threadsWaiting--;

}
    leaveCriticalSection ( Locks );
}
```

```
void WriterGroupRelease ( ob_HAN object[], int numberOfObjects )
{
  1k_HAN lock;
  entercriticalsection ( Locks );

for ( int i=0; i<numberOfObjects; i++; )
  {
    /* release object writer lock*/
    object[i]->m_writers = false;

/* wake up readers and writers waiting for this object */
    if ( object[i]->m_threadsWaiting )
       wakeupWriterAndReaderThreads (object [i]->m_lock->m_eventHandle ) ;

/* clean up object[i] ->m_lock only if no other threads are waiting for this
object */
    lock = object[i]->m_lock;

if ( !object [i]->m_threadsWaiting )
    {
       object[i]->m_lock->m_numberObjectAssigned -- ;
       object [i]->m_lock = 0;
    }
    /* if no other object is using this lock then
    /* put the lock into reusable lock list */ if ( !lock->m_numberObjectAssigned )
       addLockHandletoReuseList ( lock );
  } leavecriticalsection ( Locks );
}
```

FIG. 12

LOCKING PROTOCOL USING DYNAMIC LOCKS AND DYNAMIC SHARED MEMORY

BACKGROUND OF THE INVENTION

1. Field of the Invention

The present invention relates generally to databases and more specifically, to real time database systems or software that allows multithreading, multitasking and concurrency, of multiple users performing reading and writing over the database or shared public data section.

The present invention provides a method whereby a designated critical section monitors object status through employment of counters attached to the object's definition that will increment and decrement during reading and writing.

In essence all threads are readers whether a thread is a reader thread or a writer thread since writer threads must read first. Therefore, while the present invention provides for a reader thread and a writer thread, basically there are only reader threads that can be converted into reader/writer threads without creating a new thread once the reader/writer thread has acquired all the objects for updating whereupon those database sections are locked and updated as opposed to locking the whole database.

As aforementioned, the method assumes that all threads are reader threads and those threads that update the database will store those changes in a buffer or cache memory until the end of the transaction or API called then the changes will be committed to the source database.

This method not only prevents deadlocks since no reader can become a writer until all of the required object are obtained but should prove to be more resource efficient since only those parts of the database being updated are locked as opposed to locking sections of or the entire database.

In addition, the current methodology of listing and acquiring object lock in some numerical order to prevent deadlocks using traditional locking primitive doesn't work in a database environment where the object identifier is a customizable variable that is indeterminate until runtime. The method of the present invention requires no application processing to order object for locking. This means that the order of acquiring lock by object could be completely random.

In general, there are two kinds of threads, reader and writer, which will both be reading the database until the changes need to be committed. At that time the thread, which is ready to commit its changes, will try to convert the reader lock over all its objects that need to be updated into writer lock atomically, this means that only if the thread is able to convert all its reader lock into writer lock over every single object at once will it commit its changes. Otherwise, it won't lock any object to write or read and will wait for the next object to be released by other threads and try again.

The present invention also provides that all reader locks must be converted into writer locks atomically to preserve the integrity of the database, whereby all the changes will take place simultaneously so that other users will read the changes regardless if multiple objects were updated.

The present invention provides a global critical section that is used to protect the counters, hereinafter referred to as "m-read", "m-writer", "m-lock" and "m-threads waiting", which inclusively represent the stats of any object or resource.

In operation, the "m-read" value indicates how many threads are reading the object. Considering that the "m-writer" can only have a value of zero or one due to the requirement that only one thread can be writing or updating at any given time, "m-writer" indicates whether or not the object is being updated at any given time. Two fields comprise m-lock, "m_numberObjectsAssigned" and "m-eventHandle". The field "m_numberObjectsAssigned" represents how many objects are sharing this lock "m_lock" in the protocol code it is used to find out when to recycle the lock handle "m-lock" and "m-eventHandle" is an event handler used to synchronize the threads. The event handler is used to initiate a thread wait state when needed and will be signaled by the reader group release and writer group release functions when they are finished with the object or resource.

2. Description of the Prior Art

There are other methods designed for database concurrent updating. Typical of these is U.S. Pat. No. 4,648,036 issued to Gallant on Mar. 3, 1987.

Another patent was issued to Mohan, et al. on Jan. 4, 1994 as U.S. Pat. No. 5,276,835. Yet another U.S. Pat. No. 5,452,450 was issued to Delory on Sep. 19, 1995 and still yet another was issued on Nov. 21, 1995 to Okada as U.S. Pat. No. 5,469,567.

Another patent was issued to Slingwine, et al. on Mar. 4, 1997 as U.S. Pat. No. 5,608,893. Yet another U.S. Pat. No. 6,363,387 was issued to Ponnekanti, et al. on Mar. 26, 2002. Another was issued to Landresse on Apr. 9, 2002 as U.S. Pat. No. 6,370,528 and still yet another was issued on Aug. 12, 2003 to Ponnekanti as U.S. Pat. No. 6,606,626.

Another patent was issued to Houston, et al. on Jan. 17, 2006 as U.S. Pat. No. 6,988,105. Yet another Canadian Patent No. CA2429154 was issued to Mullins on May 23, 2002. Another was issued to Ghukasyan on Dec. 12, 2002 as International Patent Application No. WO 02/099700 and still yet another was issued on May 5, 2004 to Nixon, et al. as U.K. Patent No. GB2394816.

A method of performing update transactions in a database system to preserve consistent logical data states at all times. Each changeable data entry in the database is associated with an individual code field. When no update transaction is in progress, every code field is set to a first value. An update transaction is begun by changing a system state parameter from a NON-UPDATE to an UPDATE state. During the UPDATE state, the code fields of data entries to be added are marked with a second value and then inserted into the database. Code fields of entries to be deleted are marked with a third value. When this is complete, the system state parameter is set to a POST-UPDATE state. All code fields are then returned to the first value at which time the system is returned to the NON-UPDATE state. During the UPDATE state, all queries are given access to entries with first and third code field value. Conversely during the POST-UPDATE state, queries are allowed access only to entries with first and second code field values.

A method of controlling entry of a block of data is used with a high-speed cache which is shared by a plurality of independently-operating computer systems in a multi-system data sharing complex. Each computer system has access both to the high-speed cache and to lower-speed, upper-level storage for obtaining and storing data. Management logic in the high-speed cache assures that the block of data entered into the cache will not be overwritten by an earlier version of the block of data obtained from the upper-level storage.

A database network management method ensures consistency of modifications to data in a network of databases comprising a relational database which constitutes a reference database and at least one further database accessible in real time. The data of the relational database is duplicated at least in part in the further databases accessible in real time. To enable an application process to modify data in all of the database network, the method is as follows: (1) A data modification request in the SQL language is sent from the application process to a pool of server processes of a relational database management system, (2) a server process is assigned to the request for the duration of its processing, (3) the modification request in the dynamic SQL language is sent from the server process pool to a relational database management system and the request is executed, (4) the further databases in accessible in real time to which the modification request relates are determined, (5) the request is transferred to the further databases in a form compatible with a management system of each further database concerned, and (6) the modification request is executed in each further database concerned.

The present invention is an improved database system for reducing the wait time for database processing programs. This data system provides for the input/output of blocks of data in excess of the capacity of the buffer pool assigned to the database processing program. When a database processing program tries to refer to the same block as one already under update processing by another database processing program or tries to update the same block as one already under update processing by another data processing program, the system allows a reference or update without placing the database processing system in the waiting state.

A substantially zero overhead mutual-exclusion apparatus and method (90, 120) is provided that allows concurrent reading and updating data while maintaining data coherency. That is, a data reading process executes the same sequence of instructions that would be executed if the data were never updated. Rather than depending exclusively on overhead-imposing locks, this mutual-exclusion mechanism tracks an execution history (138) of a thread (16, 112) to determine safe times for processing a current generation (108, 130, 131) of data updates while a next generation (110, 132, 133) of data updates is concurrently being saved. A thread is any locus of control, such as a processor. A summary of thread activity (106, 122) tracks which threads have passed through a quiescent state after the current generation of updates was started. When the last thread related to the current generation passes through a quiescent state, the summary of thread activity signals a callback processor (104, 124) that it is safe to end the current generation of updates. The callback processor then processes and erases all updates in the current generation. The next generation of updates then becomes the current generation of updates. The callback processor restarts the summary of thread activity and initiates a new next generation of updates. All data-updating threads pass through a quiescent state between the time they attempt to update data and the time the data are actually updated.

A Client/Server Database System with improved methods for enhancing concurrency using a "row update" bit and deferred locking is described. Data rows in the system are designed to include ROW_DELETE and ROW_UPDATE status bits. When a transaction updates a row, it sets the ROW_UPDATE bit. When a transaction inserts a row, neither the ROW_UPDATE nor the ROW_DELETE status bits are set. When a transaction deletes a row, it sets the ROW_DELETE bit but the contents of the data row are left intact. Methods are described for processing database transactions (e.g., in response to SQL queries) using these status bits or flags, together with deferred locking techniques, in a manner that reduces locking overhead and increase concurrency. The approach provides a particular performance advantage over systems that employ row-level locking.

A method is provided in a multi-processing system where multiple user programs can operate concurrently and simultaneously to access a series of database access methods which hold multiple buffer units. Thus, there can operate simultaneously a series of Write operations to the buffer units which copy the buffer information into specialized file structures followed by a parallel series of Input/Output completion operations which test the results of the copy operations followed by parallel and simultaneous writing to the file structures of the storage control information necessary to maintain their physical integrity.

A Client/Server Database System with an enhanced Lock Manager for improving concurrency is described. The system tracks information about database columns that are updated in the Lock Manager, in addition to the exclusive lock on the data row (in case of data row locking) or data page (in case of data page locking). In particular, a new field, lrcolumns, is added to the system's record lock data structure to track which columns have been modified. When an exclusive lock is requested on a row of the table being updated in the update statement, the Lock Manager sets the value of lrcolumns. In the context of an exclusive lock that was acquired to update one or more columns of a data row, if an exclusive lock was used only to insert or delete (but not update) the data row, the lrcolumns field would be set to 0. Similarly, the lrcolumns field is 0 for locks that are not exclusive locks (e.g., shared locks). With the Lock Manager enhancement of storing information about updated columns, scan (i.e., database scan operation) can skip a row (i.e., does not block for a lock on the row) if at least one of the sargs that the row does not qualify is on a column that was not updated by the updater. The approach avoids a lot of unnecessary blocking, thereby improving concurrency significantly.

A method and system for updating a database structure. The database structure includes a dynamically changing list of control documents. A control document specifies tasks to be performed on the database structure. An agent finds an approved control document on the list such as by looking into a view of control documents. Processing the approved control document includes causing an execution of at least one task on the approved control document. Execution of such a task includes updating of the database structure, and may be implemented by the agent that found the control document or by another agent called by the agent.

The present invention provides a system and method for dynamic object-driven database manipulation and mapping system (3A) which relates in general to correlating or translating one type of database to another type of database or to an object programming application. Correlating or translating involves relational to object translation, object to object translation, relational to relational, or a combination of the above. Thus, the present invention is directed to dynamic mapping of databases to selected objects. Also provided are systems and methods that optionally include caching components (3A, 51), security features (303), data migration facilities, and components for reading, writing, interpreting and manipulating XML and XMI data files (7, 51, 52, 8).

A dynamic database management system (FIG. 1) includes a data dictionary (101), a data importer (102) and a query front-end (103). The data importer automatically imports data from an input file into a database, while adding new tables for new attributes as necessary, and updating parameters and folders tables in the data dictionary accordingly, so that end-users may access the imported data by database queries through the query front-end.

Multiple clients are given concurrent access to a database component stored on a database by a server which has a shared cache. The cache has a memory store coupled to the database that holds a copy of the database component. The memory store has a store gate that controls access to the store.

The clients when accessing the memory store do so with their own client thread each of which includes a server component that communicates with the store gate and the client with respect to the database component. The database server may include a notify thread that detects changes to the database component and notifies the memory store gate of the change. The store gate may then notify the client server components which then notify the clients which are accessing the changed database component. The database server may include a lock manager which causes the memory store gate to prevent writes to the memory store by all but one of the clients when the one client is writing to the memory store.

While these systems may be suitable for the purposes for which they were designed, they would not be as suitable for the purposes of the present invention, as hereinafter described.

SUMMARY OF THE PRESENT INVENTION

A primary object of the present invention is to provide means for synchronizing multiple threads reading and writing to a database.

Another object of the present invention is to provide means whereby multiple threads concurrently accessing a database can not be deadlocked.

Yet another object of the present invention is to provide a method wherein an object's definition has a pair of counters and a lock indicator that are used in conjunction with computer software instructions for controlling object updating.

Still yet another object of the present invention is to provide a method wherein the updated objects are retained in a buffer.

Another object of the present invention is to provide a critical section that is used to protect said counters which represent the stats of any object or resource.

Yet another object of the present invention is to solve the problem where the objects to be updated change dynamically at runtime.

Still yet another object of the present invention is to provide a mechanism wherein the memory overhead for each object is very small, therein helping programmers to build more granular and distributed database systems and increasing concurrency into the database.

Additional objects of the present invention will appear as the description proceeds.

The present invention overcomes the shortcomings of the prior art by providing a method whereby a designated critical section monitors object status through employment of counters attached to the object's definition that will increment and decrement during reading and writing operations.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 a block diagram of the present invention's method of updating utilizing dynamic locks and dynamic objects;

Figure 4:
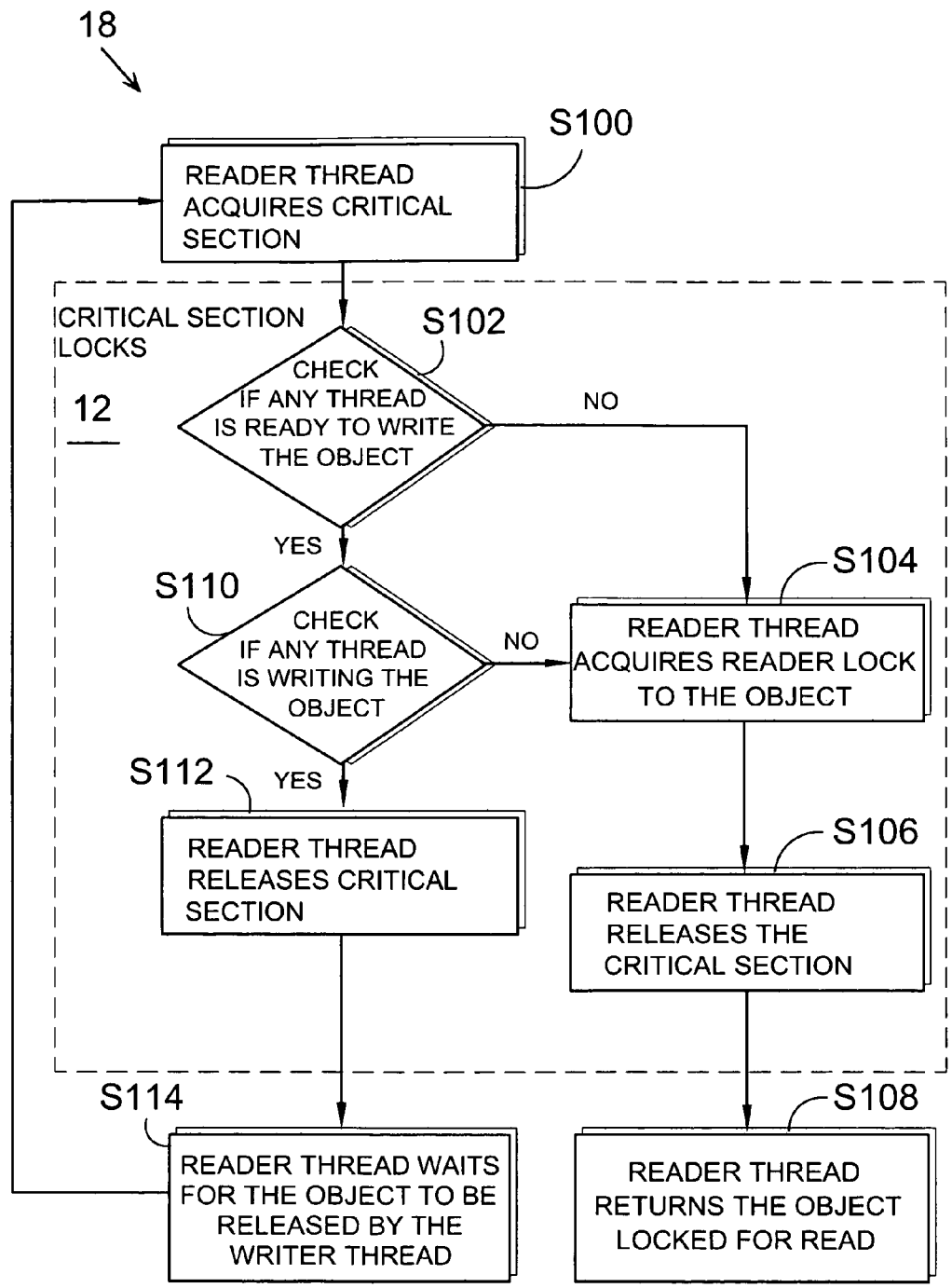
Figure 5:
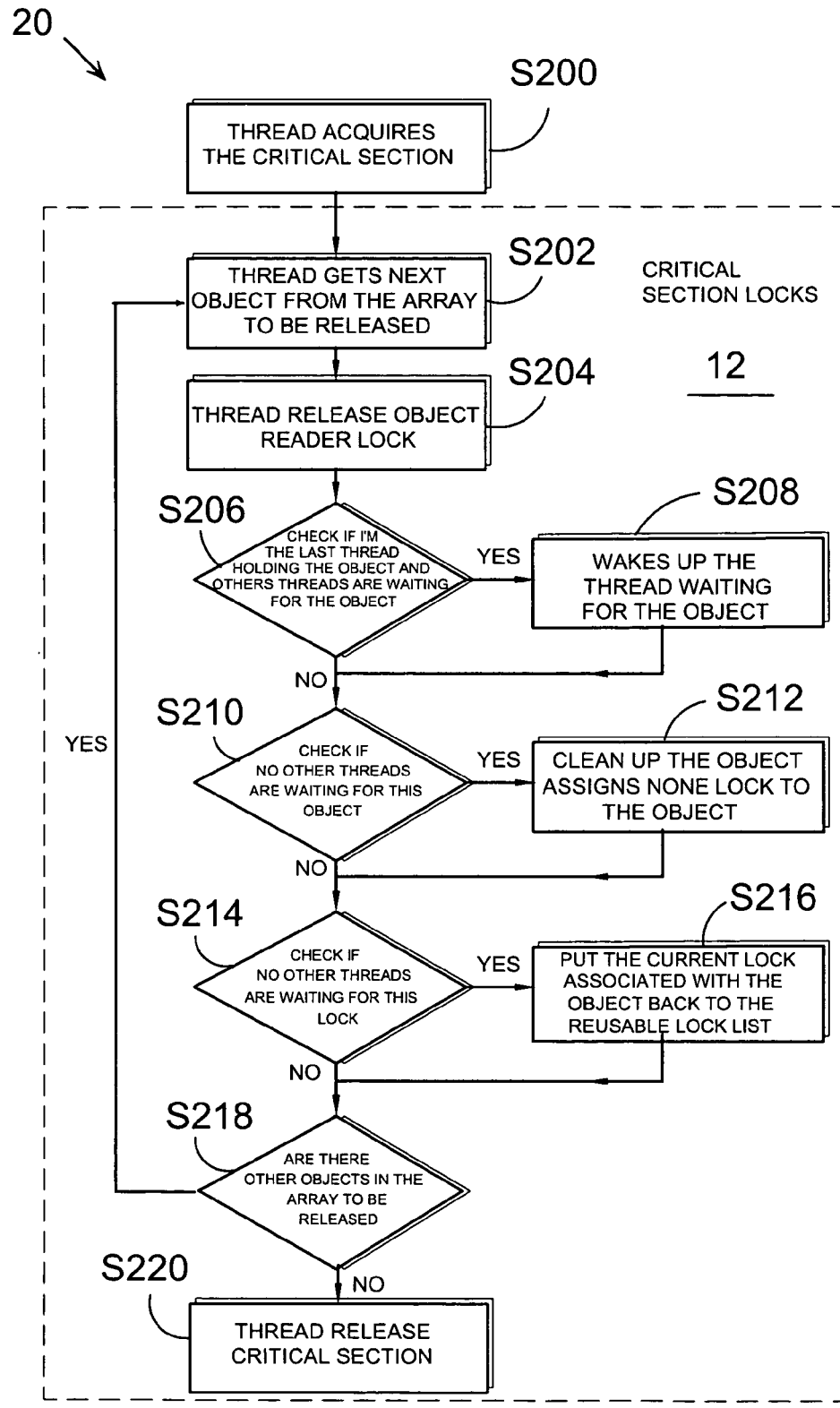
Figure 6:
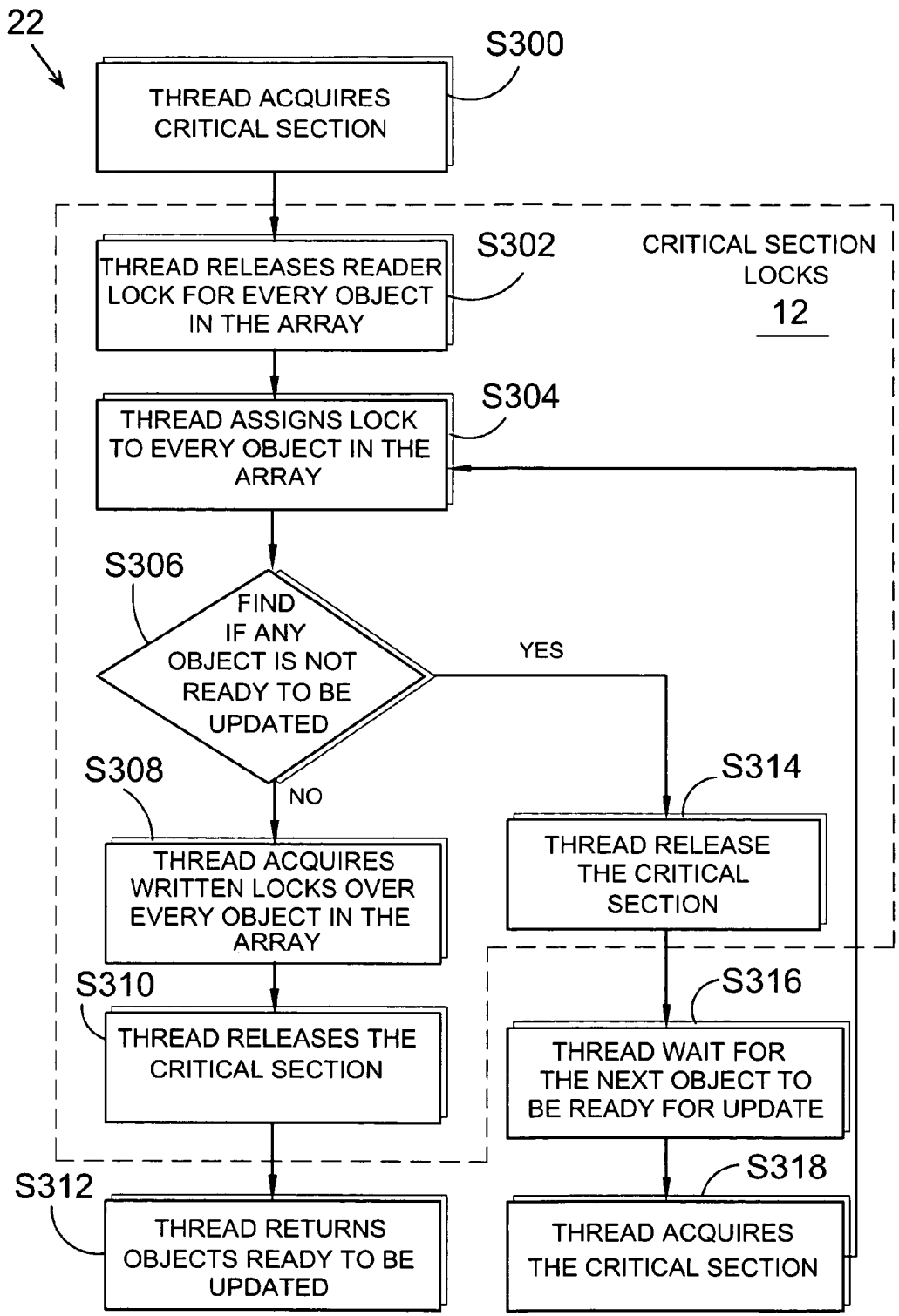
Figure 7:
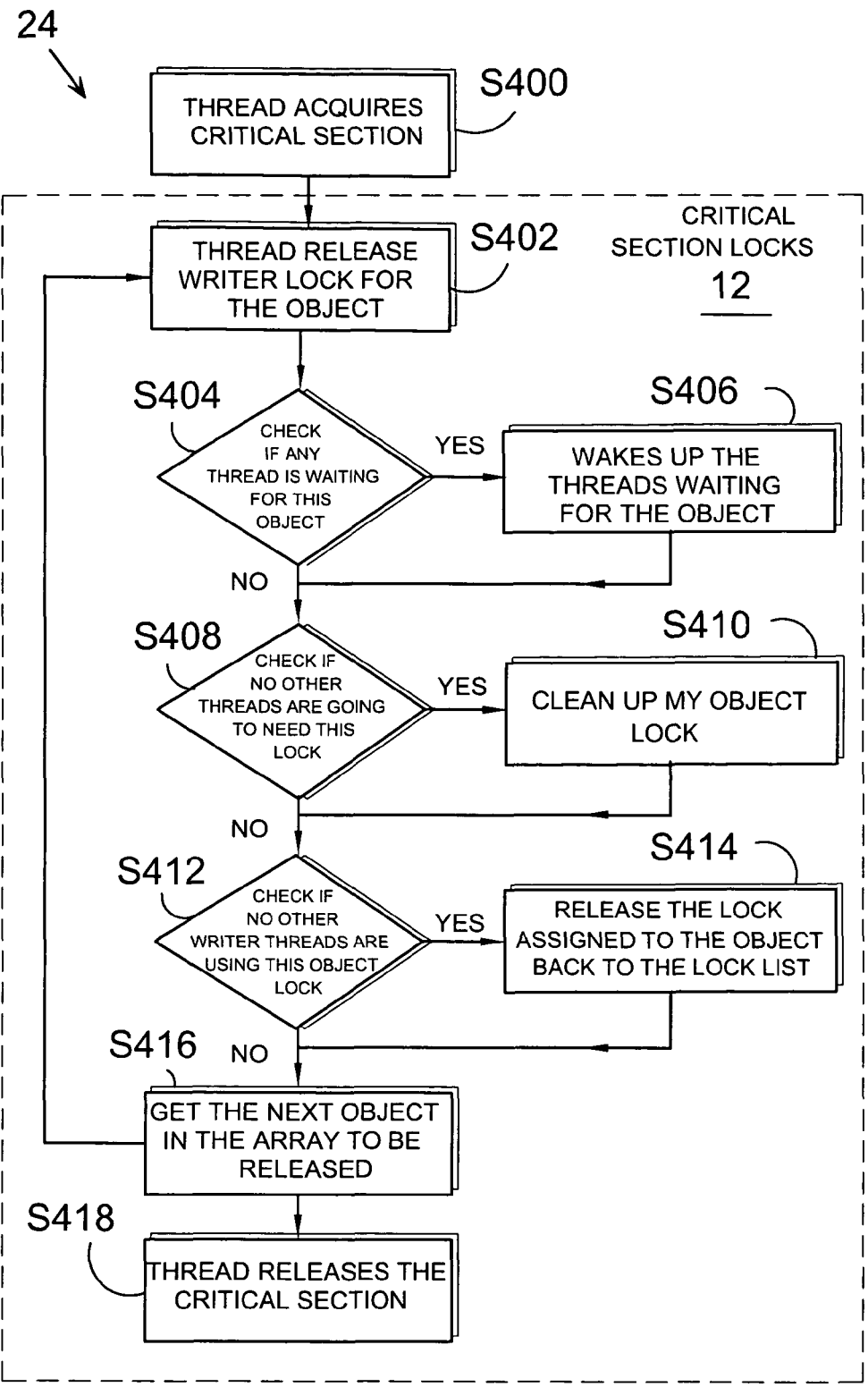

FIG. 4, shown is a block diagram of the present invention's reader lock;

FIG. 5 is a flow chart depicting the reader group release function of the present invention;

FIG. 6 is a flow chart depicting the writer group lock function of the present invention;

FIG. 7 is a block diagram of the present invention's method of utilizing a writer group release;

FIG. 8 is an example implementation of the method for the present invention's basic definitions utilizing C programming;

FIG. 9 is an example implementation of the method for the present invention's reader lock function utilizing C programming;

FIG. 10 is an example implementation of the method for the present invention's reader group release function utilizing C programming;

FIGS. 11A through 11C is an example implementation of the method for the present invention's writer group lock function utilizing C programming; and FIG. 12 is an example implementation of the method for the present invention's writer group release function utilizing C programming.

While certain novel features of this invention have been shown and described and are pointed out in the annexed claims, the invention is not intended to be limited to the details above, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that fairly constitute essential characteristics of the generic or specific aspects of this invention.

DESCRIPTION OF THE REFERENCED NUMERALS

Turning now descriptively to the drawings, in which similar reference characters denote similar elements throughout the several views, the figures illustrate the Safety Check Latch Apparatus of the present invention. With regard to the reference numerals used, the following numbering is used throughout the various drawing figures.

10 Method and System for a Locking Protocol using Dynamic Locks and Dynamic Shared Memory
12 critical section
14 process protocol changing reader threads into writer threads
16 functional implementation of 10
18 reader lock
20 reader group release 22 writer group lock
24 writer group release
26 data definition code example
28 reader lock code example
30 reader group release code example
32 writer group lock code example
34 writer group release code example

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
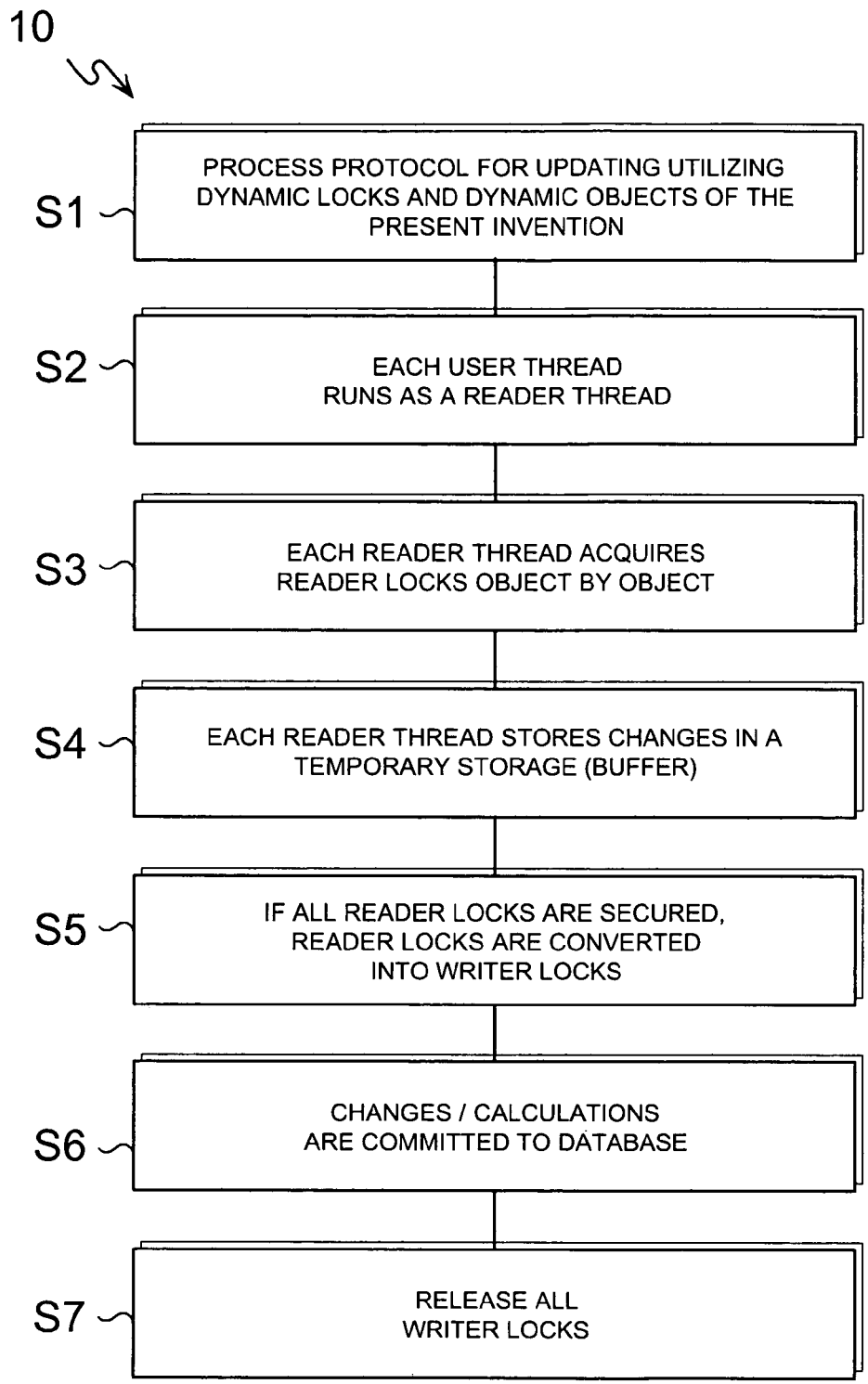

Referring to FIG. 1, shown is a block diagram of the present invention's method of updating utilizing dynamic locks and dynamic objects. The process protocol for updating utilizing dynamic locks and dynamic objects of the present invention 10, shown in Step S1, mandates that each user thread runs as a reader thread, in Step S2, whereupon each reader thread acquires reader locks object by object, shown in Step S3, and that each reader thread stores changes in a temporary storage, such as a buffer as shown in Step S4. In Step S5, if all reader locks are secured then said reader locks are atomically converted into writer locks, then, in Step 6, all changes and calculation are committed to the database and all writer locks are released, as shown in Step S7.

Figure 2:
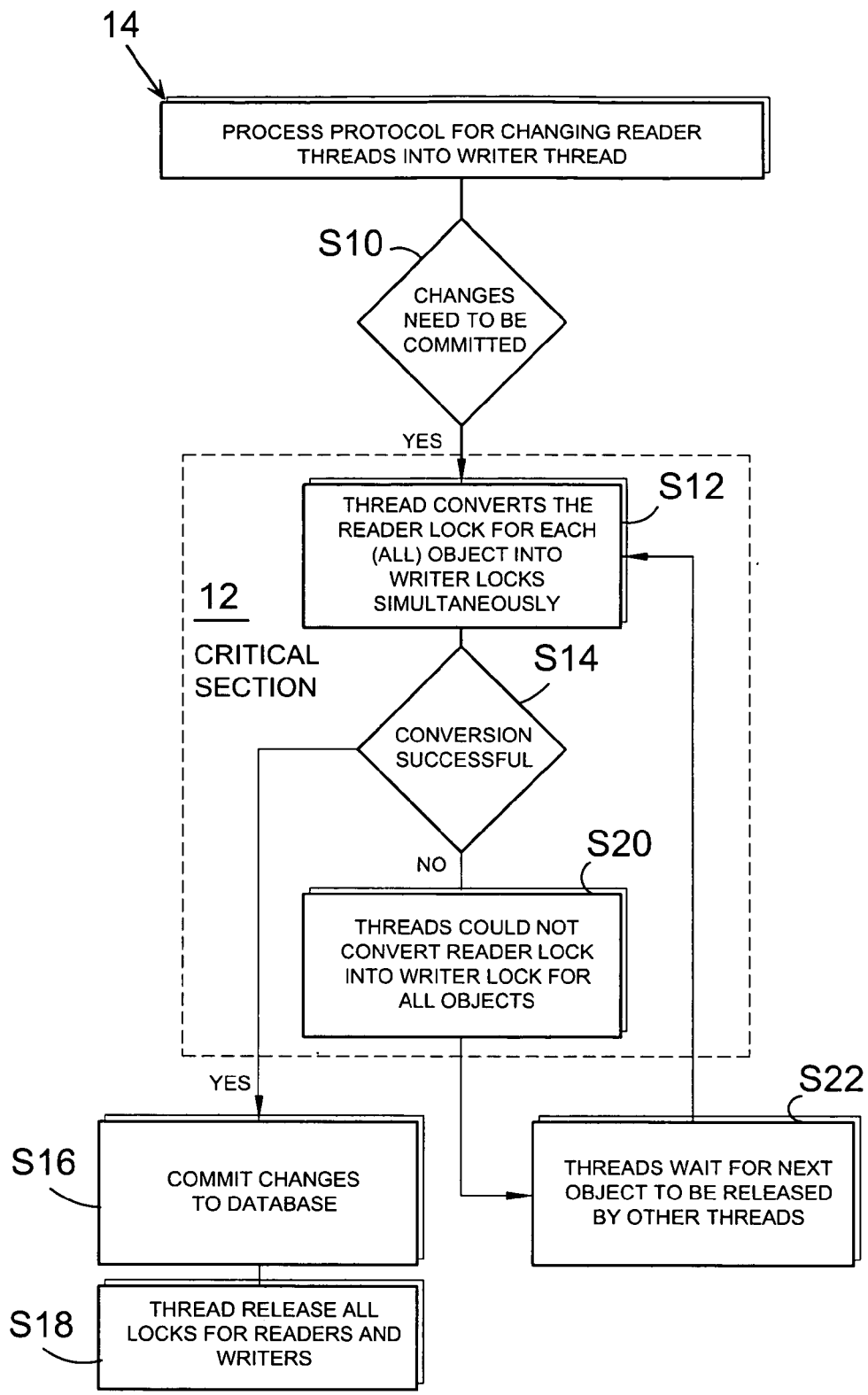
FIG. 2 is a flow chart of the present invention's method for changing reader threads into writer threads.

Referring to FIG. 2, shown is a flow chart of the present invention's method for changing reader threads into writer threads. The process protocol for changing reader threads into writer threads 14 is determined by the need for changes to be committed to the resource, as illustrated in Step S10, whereupon the process critical section 12 converts the reader lock for all objects into writer locks simultaneously, as shown in Step S12, and in Step S14, if the conversion is completely successful, the changes are committed to the database, in Step S16 and the thread releases all reader and write lock, as shown in Step S18. In Step S20, if the thread could not convert reader lock into writer lock for all objects then no writer locks are created and the thread exits the critical section and waits for the next object to be released by other threads, in Step S22 and reenters the critical section 12 with Step S12.

Figure 3:
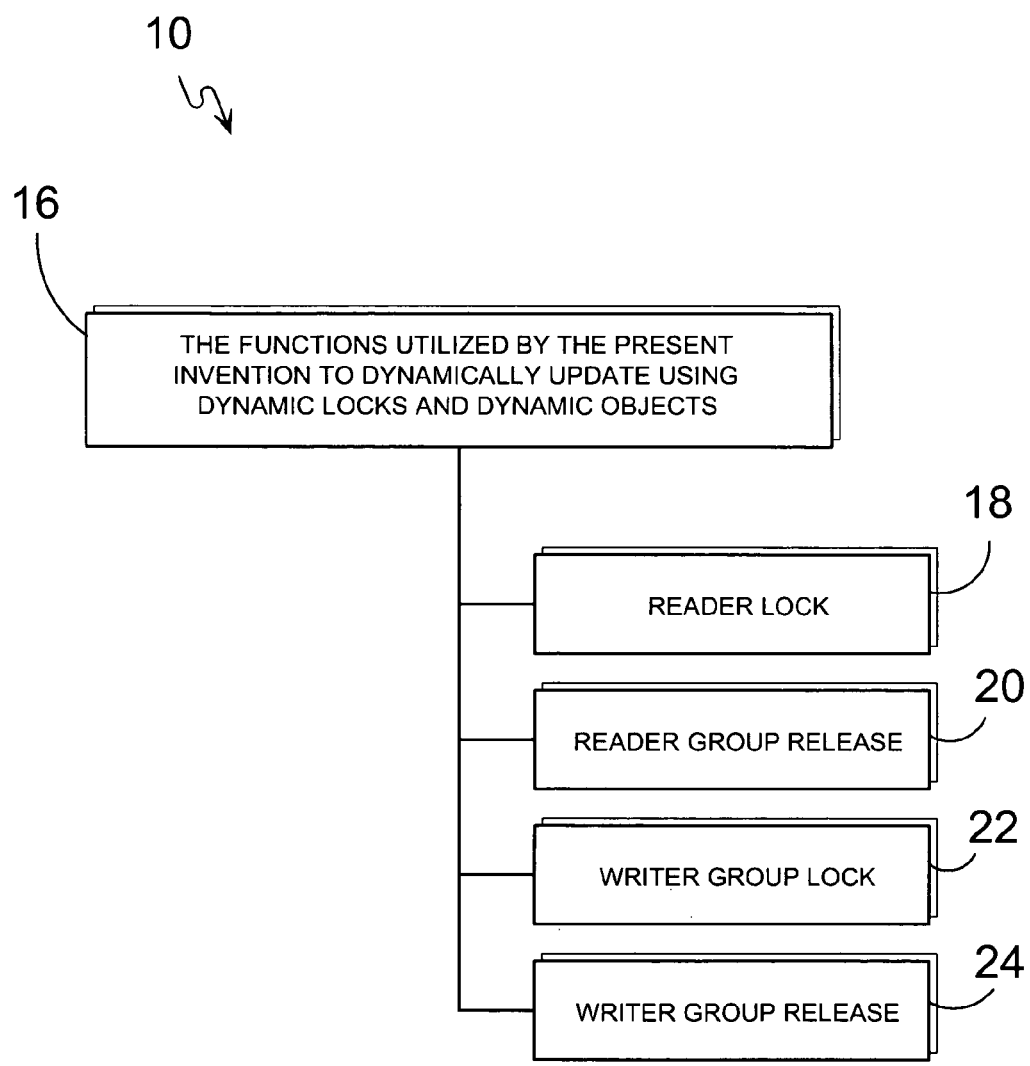
FIG. 3 is a block diagram of the functions utilized by the present invention to dynamically update using dynamic locks and dynamic objects.

Referring to FIG. 3, shown is a block diagram of the functions utilized by the present invention to dynamically update using dynamic locks and dynamic objects. The method and system of the present invention 10 provides functions 16 for dynamically updating a resource using dynamic locks and dynamic objects. Each of the functions are illustrated in the accompanying drawings in flowchart and illustrative code example. The functions are comprised of a reader lock 18, shown in flowchart as FIG. 4 and illustrated in code in FIG. 9. Reader group release 20, shown in flowchart as FIG. 5 and illustrated in code in FIG. 10. Writer group lock 22, shown in flowchart as FIG. 6 and illustrated in code in FIGS. 11A, 11B and 11C and writer group release 24, shown in flowchart as FIG. 7 and illustrated in code in FIG. 12.

Referring to FIG. 4, shown is a block diagram of the present invention's reader lock. The reader lock 18 provides that the reader thread acquires the critical section in Step S100. In Step S102, if no thread is ready to write to the object then in Step S104, the reader thread acquires reader lock to the object and, in Step S106, the reader thread release the critical section 12 and the object is returned locked for reading, as shown in Step S108. If any thread, in Step S102 is ready to write the object and is not currently writing the object, Step S110, processing continues with Step S104 or the object is being written wherethen in Step S112 the reader thread releases the critical section 12, and waits for the object to be released by the writer thread, as shown in Step S114, and attempts to acquire the critical section, shown in Step S100.

Referring to FIG. 5, shown is a flow chart depicting the reader group release function of the present invention. The reader lock release 20 provides that the reader thread acquires the critical section 12 in Step S200. In Step S202, the thread gets the next object in the array for lock release and releases the object reader lock, Step S204. In step S206, if other threads are waiting for this object and no other threads are waiting for this object, the thread waiting is woken up. In Step S210, if no other threads are waiting for this object, no lock is assigned to the object in Step S212. In Step S214, if no other threads are waiting for this lock, the lock is put back in the reusable lock list. In Step S218, if there are other objects in the array to be released processing continues with Step S202 otherwise the thread releases the critical section, as shown in Step S220.

Referring to FIG. 6, shown is a flow chart depicting the writer group lock function of the present invention. The writer group lock 22 provides that the thread acquires the critical section 12 in Step S300. In Step S302, the thread gets the next object in the array for reader lock release and releases the object reader lock for every object in the array and assigns lock to every object in the array, Step S304. If any object is not ready for update, Step S306, then in Step S314, the thread releases the critical section and waits in Step S316 for the next object ready for update whereupon, in Step S318, the thread acquires the critical section and processing continues with Step S304. In Step S306, if all objects in the array are ready to be updated, the thread acquires written locks over every object in the array, as shown in Step S308, Whereupon, in Step S310, the critical section is released and the thread returns the objects ready to be updated, Step S312.

Referring to FIG. 7, shown is a block diagram of the present invention's method of utilizing a writer group release. The writer group release 24 provides that the thread acquires the critical section 12 in Step S400. In Step S402, the thread releases the object writer lock. In step S404, if any thread is waiting for this object, the thread waiting is woken up. In Step S408, if no other threads are waiting for this lock, clean up object lock, step S410. In Step S412, if no other writer threads are using the object lock, the lock is released back to the lock list, as shown in Step S414. If there are other objects in the array to be released, Step S416, processing continues with Step S402 otherwise the thread releases the critical section, as shown in Step S418.

Referring to FIG. 8, shown is an example implementation of the method for the present invention's basic definitions utilizing C programming. For illustrative purposes, an implementation of the object data definitions 26 are illustrated with the foreknowledge that other programming languages may be employed with similar results.

Referring to FIG. 9, shown is an example implementation of the method for the present invention's reader lock function utilizing C programming. For illustrative purposes, an implementation of the reader lock function 18 is illustrated in code 28 with the foreknowledge that other programming languages may be employed with similar results.

Referring to FIG. 10, shown is an example implementation of the method for the present invention's reader group release function utilizing C programming. For illustrative purposes, an implementation of the reader group release function 20 is illustrated in code 30 with the foreknowledge that other programming languages may be employed with similar results.

Referring to FIGS. 11A through 11C, shown is an example implementation of the method for the present invention's writer group lock function utilizing C programming. For illustrative purposes, an implementation of the writer group lock function 22 is illustrated in code 32 with the foreknowledge that other programming languages may be employed with similar results.

Referring to FIG. 12, shown is an example implementation of the method for the present invention's writer group release function utilizing C programming. For illustrative purposes, an implementation of the reader lock function 24 is illustrated in code 34 with the foreknowledge that other programming languages may be employed with similar results.

While certain novel features of this invention have been shown and described and are pointed out in the annexed claims, the invention is not intended to be limited to the details above, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that fairly constitute essential characteristics of the generic or specific aspects of this invention.

What is claimed is new and desired to be protected by Letters Patent is set forth in the appended claims:

1. A method of synchronizing read and write operations performed over shared memory objects, the method for use in conjunction with computer software instructions, the method comprising:
   providing a plurality of shared memory objects for use with the computer software instructions, associating a lock status with each shared memory object;
   providing a plurality of threads, said plurality of threads performing read and write operations on said plurality of shared memory objects;
   providing a reader lock function, said reader lock function allowing said threads to acquire reader lock over said shared memory objects to protect reader operations of said threads over said shared memory objects;
   providing a writer group lock function, said writer group lock function allowing said threads to acquire writer lock over shared memory objects atomically to protect write operations of said threads over said shared memory objects;
   providing a reader group release function, said writer group release function allowing said threads to release reader lock on said shared memory objects;
   providing a writer group release function, said writer group release function allowing said threads to release writer lock on said shared memory objects;
   providing only a single global critical section for all the shared memory objects, each of said functions residing within said single global critical section, said single global critical section operating in conjunction with each the functions to protect the lock status of all the shared memory objects, thereby achieving concurrency among said plurality of threads, said single global critical section atomically accessing the lock status of every shared memory object present at runtime thereby avoiding deadlock among said threads;
   establishing a group of related memory objects from said plurality of shared memory objects at runtime by any thread in conjunction with said reader lock function;
   wherein said writer group lock function is provided with logical steps that determine the movement of any thread through the writer group function, the steps comprising:
      i) a release step wherein the thread releases the reader lock for every object within said group of related memory objects;
      ii) a lock handle assignment step wherein the thread assigning a shared lock handle to every object in the group of related memory objects;
      iii) a memory object ready step wherein the thread checks each memory object in said group of related memory objects to verify that every memory object of the group of related memory objects is ready for writer lock;
      iv) said memory object ready step directing the thread to a writer lock step only when all memory objects of said group of related memory objects are available for writer lock;
      v) said writer lock step acquires writer lock for all memory objects in said group of related memory objects atomically, directs the thread to release the single global critical section, and returns said group of related memory objects ready to be updated;
      vi) said memory object ready step directing the thread to release the single global critical section when any object is unavailable to be updated, directing the thread to wait for the unavailable object to be ready for writer lock, and then directing the thread to acquire the single global critical section at the lock handle assignment step when the unavailable object is ready for writer lock.

2. The method of claim 1, wherein said group of related memory objects are randomly accessed at runtime, thereby preserving integrity of data without producing any deadlocks among threads of multi-threading programs.

3. The method of claim 1, wherein each memory object of said plurality of shared memory objects having an object definition, the lock status of a memory object is associated with its respective object definition.

4. A method of synchronizing read and write operations performed over shared memory objects, the method operating in conjunction with a multi-threading computer program, the combination comprising:
   providing a multi-threading computer program;
   providing a plurality of shared memory objects for use with the multi-threading computer program, associating a lock status with each shared memory object;
   providing a plurality of threads, said plurality of threads performing read and write operations on said plurality of shared memory objects;
   providing a reader lock function, said reader lock function allowing said threads to acquire reader lock over said shared memory objects to protect reader operations of said threads over said shared memory objects;
   providing a writer group lock function, said writer group lock function allowing said threads to acquire writer lock over said shared memory objects atomically to protect write operations of said threads over said shared memory objects;
   providing a reader group release function, said writer group release function allowing said threads to release reader lock on said shared memory objects;

providing a writer group release function, said writer group release function allowing said threads to release writer lock on said shared memory objects;

providing only a single global critical section for all the shared memory objects, each of said functions residing within said single global critical section, said single global critical section operating in conjunction with each the functions to protect the lock status of all the shared memory objects, thereby achieving concurrency among said plurality of threads, said single global critical section atomically accessing the lock status of every shared memory object present at runtime thereby avoiding deadlock among said threads;

said multi-threading computer program evoking the operation of each of said functions;

establishing a group of related memory objects from said plurality of shared memory objects at runtime by any thread in conjunction with said reader lock function and said multi-threading computer program;

wherein said writer group lock function is provided with logical steps that determine the movement of any thread through the writer group function, the steps comprising:

i) a release step wherein the thread releases the reader lock for every object within said group of related memory objects;

ii) a lock handle assignment step wherein the thread assigning a shared lock handle to every object in the group of related memory objects;

iii) a memory object ready step wherein the thread checks each memory object in said group of related memory objects to verify that every memory object of the group of related memory objects is ready for writer lock;

iv) said memory object ready step directing the thread to a writer lock step only when all memory objects of said group of related memory objects are available for writer lock;

v) said writer lock step acquires writer lock for all memory objects in said group of related memory objects atomically, directs the thread to release the single global critical section, and returns said group of related memory objects ready to be updated;

vi) said memory object ready step directing the thread to release the single global critical section when any object is unavailable to be updated, directing the thread to wait for the unavailable object to be ready for writer lock, and then directing the thread to acquire the single global critical section at the lock handle assignment step when the unavailable object is ready for writer lock.

5. The combination of claim 4, wherein said group of related memory objects are randomly accessed at runtime, thereby preserving integrity of data without producing any deadlocks among threads of multi-threading programs.

6. The combination of claim 4, wherein each memory object of said plurality of shared memory objects having an object definition, the lock status of a memory object is associated with its respective object definition.

7. The method of claim 1, wherein a waiting state of any thread for the reader lock and writer group lock functions is outside the single global critical section.

8. The combination claim 4, wherein a waiting state of any thread for the reader lock and writer group lock functions is outside the single global critical section.

9. The combination of claim 4, wherein the reader lock function is provided with logical steps that determine the movement of any thread through the reader lock function, the steps comprising:

first check step where the thread determines if any other thread is acquiring writer lock over the object, if yes then the thread is directed to a second check step, if no then the thread acquires reader lock over the object and releases the single global critical section; and the second check step determining if any of other thread is holding a writer lock on the object, if yes then the thread releases the single global critical section and enters a waiting state until the object is released by the writer thread and then the reader thread reacquires the single global critical section at the first check step, if no then the thread acquires reader lock over the object and releases the single global critical section.

10. The combination of claim 4, wherein the reader group release function is provided with logical steps that determine the movement of any thread through the reader group release function, the steps comprising:

a start loop step where a loop is established to check all the objects of said group of related memory objects one by one;

a release step where the thread releases reader lock over the object;

a first check step to determine if any other thread is waiting for this object and to determine if the current thread is the last thread holding reader lock over the object, if yes then the waiting thread wakes up for the object and proceed to a second check step, if no then proceed to the second check step;

the second check step to determine that no other threads are waiting for this object, if yes then clean up the shared lock handle for the object and proceed to a third check step, if no then proceed to the third check step;

the third check step to determine that no other object is sharing the shared lock handle, if yes then put the shared lock handle to a reusable lock handle list and proceed to a fourth check step, if no then proceed to the fourth check step; and the fourth check step to determine if there is any other object among said group of related memory objects to be released, if yes, then return to the start loop step, if no then thread releases the single global critical section.

11. The combination of claim 4, wherein the writer group release function is provided with logical steps that determine the movement of any thread through the writer group release function, the steps comprising:

a start loop step where a loop is established to check all the objects of said group of related memory objects one by one;

a release step where the thread releases writer lock over the object;

a first check step to determine if any other thread is waiting for this object, if yes then the waiting thread wakes up for the object and proceed to a second check step, if no then proceed to the second check step;

the second check step to determine that no other threads are waiting for this object, if yes then clean up the shared lock handle for the object and proceed to a third check step, if no then proceed to the third check step;

the third check step to determine that no other object is sharing the shared lock handle, if yes then put the shared lock handle to a reusable lock handle list and proceed to a fourth check step, if no then proceed to the fourth check step; and the fourth check step to determine if there is any other object among said group of related memory objects to be released, if yes, then return to the start loop step, if no then thread releases the single global critical section.

12. The method of claim 1, wherein the reader lock function is provided with logical steps that determine the movement of any thread through the reader lock function, the steps comprising:
first check step where the thread determines if any other thread is acquiring writer lock over the object, if yes then the thread is directed to a second check step, if no then the thread acquires reader lock over the object and releases the single global critical section; and
the second check step determining if any of other thread is holding a writer lock on the object, if yes then the thread releases the single global critical section and enters a waiting state until the object is released by the writer thread and then the reader thread reacquires the single global critical section at the first check step, if no then the thread acquires reader lock over the object and releases the single global critical section.

13. The method of claim 1, wherein the reader group release function is provided with logical steps that determine the movement of any thread through the reader group release function, the steps comprising:
a start loop step where a loop is established to check all the objects of said group of related memory objects one by one;
a release step where the thread releases reader lock over the object;
a first check step to determine if any other thread is waiting for this object and to determine if the current thread is the last thread holding reader lock over the object, if yes then the waiting thread wakes up for the object and proceed to a second check step, if no then proceed to the second check step;
the second check step to determine that no other threads are waiting for this object, if yes then clean up the shared lock handle for the object and proceed to a third check step, if no then proceed to the third check step;
the third check step to determine that no other object is sharing the shared lock handle, if yes then put the shared lock handle to a reusable lock handle list and proceed to a fourth check step, if no then proceed to the fourth check step; and
the fourth check step to determine if there is any other object among said group of related memory objects to be released, if yes, then return to the start loop step, if no then thread releases the single global critical section.

14. The method of claim 1, wherein the writer group release function is provided with logical steps that determine the movement of any thread through the writer group release function, the steps comprising:
a start loop step where a loop is established to check all the objects of said group of related memory objects one by one;
a release step where the thread releases writer lock over the object;
a first check step to determine if any other thread is waiting for this object, if yes then the waiting thread wakes up for the object and proceed to a second check step, if no then proceed to the second check step;
the second check step to determine that no other threads are waiting for this object, if yes then clean up the shared lock handle for the object and proceed to a third check step, if no then proceed to the third check step;
the third check step to determine that no other object is sharing the lock handle, if yes then put the shared lock handle to a reusable lock handle list and proceed to a fourth check step, if no then proceed to the fourth check step; and
the fourth check step to determine if there is any other object among said group of related memory objects to be released, if yes, then return to the start loop step, if no then thread releases the single global critical section.

* * * * *